United States Patent Office 3,018,667
Patented Jan. 30, 1962

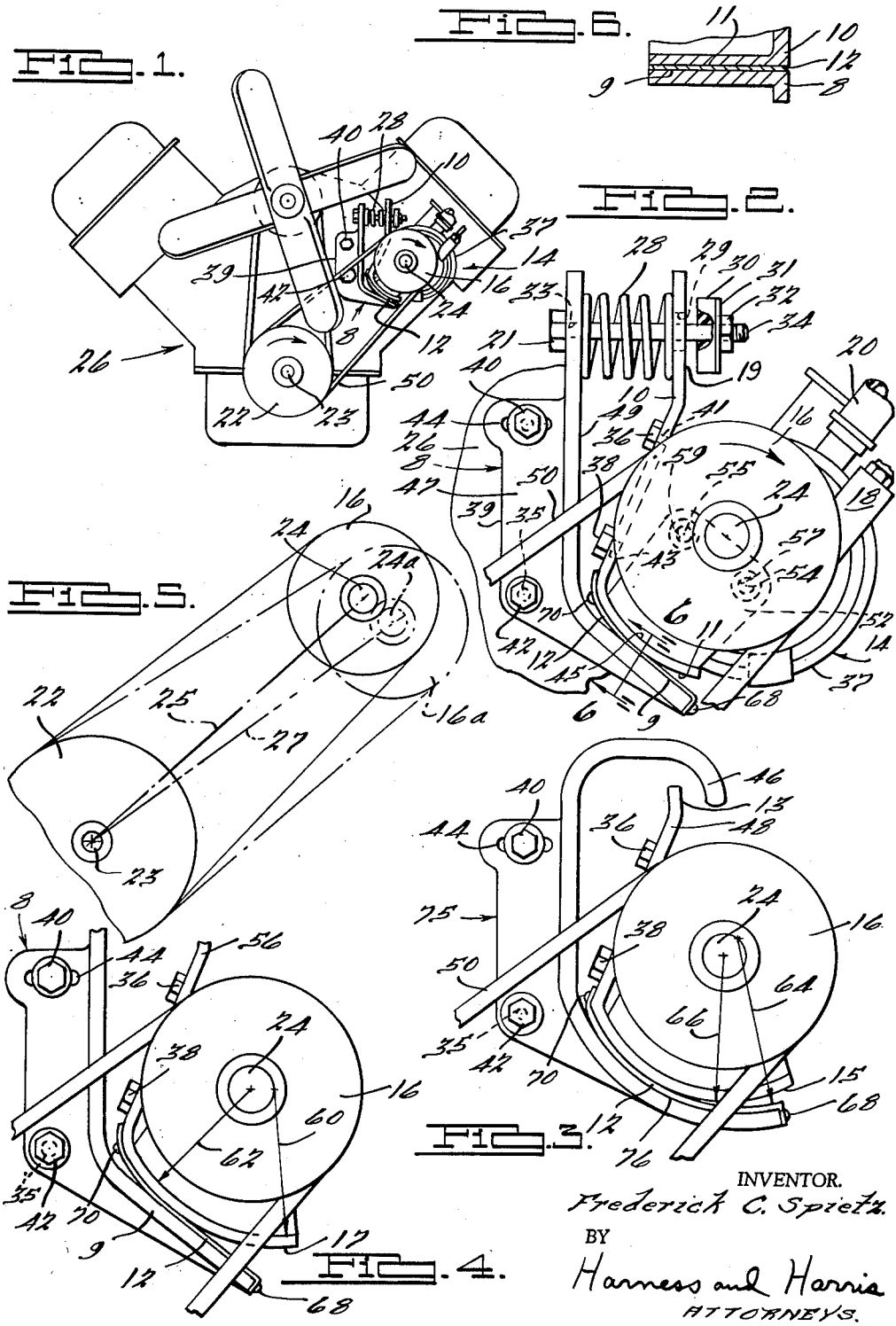

3,018,667
BELT TIGHTENER
Frederick C. Spietz, Northville, Mich., assignor to Chrysler Corporation, Highland Park, Mich., a corporation of Delaware
Filed Feb. 20, 1958, Ser. No. 716,419
5 Claims. (Cl. 74—242.9)

My invention is concerned with a torque responsive mounting device which automatically regulates the tension of a drive belt of a motor driven accessory power developing mechanism so as to eliminate the slippage of said drive belt on the associate pulleys.

In accessory power developing mechanisms such as hydraulic steering pumps and electrical generators on automotive vehicles the resistance to free rotation of the impeller shaft or rotor shaft causes the drive belt to slip on the accessory pulley and produce noise and heat. Both the noise and the heat are serious factors, the heat developed causing premature wearing of the drive belt and the noise being particularly objectionable to the vehicle operator or passengers in addition to representing a power loss.

To eliminate the slippage of the drive belt on the accessory pulley, I have proposed herein means to automatically increase tension on the drive belt as the resistance to free rotation of the accessory pulley increases.

To accomplish this belt tensioning to the extent required by the load imposed upon accessory shaft or rotor, an extremely simple, yet ingenious accessory mounting mechanism is proposed, a detailed description of which follows.

In the drawings:

FIGURE 1 is a front end view of an engine having a belt-driven accessory hydraulic steering pump attached thereto;

FIGURE 2 is an enlarged front end view of the accessory hydraulic pump and the mounting therefor shown in FIGURE 1;

FIGURE 3 is an enlarged front end view of the accessory hydraulic pump shown in FIGURE 2 and shows a variation in the supporting and riding surfaces of the pump, mount, and also a variation in the roll limiting mechanism.

FIGURE 4 is an enlarged front end view of the accessory hydraulic pump shown in FIGURE 2, and shows another variation in the supporting and riding surfaces of the mount;

FIGURE 5 is a geometrical representation of the direction and extent of automatic shift of the accessory under load with respect to the engine drive shaft; and FIGURE 6 is a cross sectional view along line 6—6 of FIGURE 2 showing the relatively large supporting and riding surfaces and the connecting strap interposed therebetween.

Referring to FIGURE 1 of the drawings, 26 represents a V-type automative engine. The drive shaft and pulley of the engine are represented by 23 and 22 respectively. The direction of rotation of the crankshaft is clockwise. A torque responsive mounting device 8 is secured to the front of said engine by bolts 40 and 42 which pass through aperture 35 and slot 44 in bracket 39 (see FIGURE 2), and are threadedly received in apertures (not shown) provided in said engine. A rotary hydraulic power steering pump 14 is shown mounted to an arm 10 that is associated with said bracket 39. The shaft and pulley of said pump are represented by 24 and 16 respectively. A drive belt 50 connects pulleys 22 and 16 and imparts a clockwise rotation to pulley 16 of the pump in response to to rotation of the crankshaft 23. The rotation of pump pulley 16 transmits a clockwise torque to pump shaft 24 and to a fluid pressure developing impeller (not shown) secured to said shaft.

Referring to FIGURE 2 of the drawings, 20 and 18 represent inlet and outlet lines of the rotary hydraulic pump 14. The pump is secured to an arm 10 by bolts 36 and 38 which pass through apertures 41 and 43 in arm 10 and by bolts 54 and 55 which pass through apertures 57 and 59 provided in flange 52 which flange in integral with and projects up from the concave surface 45 of arm 10. Suitable threaded apertures (not shown) are provided in the pump housing 37 to threadably receive said bolts 36, 38, 54, and 55.

The lowermost side of arm 10 (see FIGURE 2) is provided on one end with a curved cam portion having a convex riding surface 11 and concave surface 45. Projecting up from the concave surface 45 is the flange 52 described above. An abutment portion 19 having a guide slot 29 is provided on the upper end of arm 10.

Flange 47 of bracket 39 in FIGURE 2 is provided with an adjusting slot 44 and an aperture 35. Integral with said flange and lying in a plane substantially perpendicular thereto is a flange 49 having at one end a smooth flat supporting surface 9 and at the other end an aperture 33. It is seen from FIGURE 2 the surface 9 makes an acute angle to the right of and with the longitudinal axis of the drive belt. A guide stud or stop supporting stud 34 projects through said aperture 33 and head 21 of stud 34 bears against flange 49. Stud 34 projects through a guide slot 29 in abutment portion 19 of arm 10 and is retained thereon by nut 32, washer 31 and resilient stop member 30 which may be of rubber or other shock absorbing material. Surrounding stud 34 and interposed between flange 49 and abutment portion 19 is a coil spring 28 which resiliently urges portion 19 of arm 10 toward stop member 30.

A flexible sheet metal strap 12 is connected at one end to arm 10 (FIGURE 2) at 70 and at the other end to flange 49 at 68. The connection at these points may be made by any well known securing means such as riveting, welding, brazing, or by screws.

Referring to the modified form of the invention shown in FIGURE 3 of the drawing, a stop portion 46 of bracket 75 overhangs the abutment portion 13 of arm member 48. This particular construction provides a stop means for the pump supporting arm 48 and presents a variation over the resilient stop means 30, 31, 32, and 34 of FIGURE 2. FIGURE 3 also shows a variation in the shape of the supporting surface 76 of the bracket. In this figure it is shown that the supporting surface 76 of bracket 75 is curved as distinguished from the flat supporting surface 9 of bracket 8 in FIGURE 2. The radii of curvature of riding surface 15 and of supporting surface 76 are represented by 66 and 64 respectively.

FIGURE 4 shows a variation in the curvature of the riding surface of either FIGURE 2 or 3. This variation comprises a riding surface 17 having a radius of curvature 62 over one portion thereof and a radius curvature 60 over another portion thereof. The portion of the riding surface having radius 62 is designed to provide relatively small belt tightening increments whereas the portion of the riding surface having radius 60 is designed to provide relatively large belt tightening increments. It is obvious that either the supporting surface of the bracket or the riding surface of the associated arm could be shaped so as to produce this effect. The particular curvature of the supporting surface of the bracket and the riding surface of the arm will depend upon the change in driving belt tension desired for a particular job and any combination of supporting surface and riding surface curvatures shown in FIGURES 2, 3 and 4 may be used as required.

In FIGURE 5, line 25 represents the normal distance between pulley centers of the drive belt 50 before the belt and the associated pump pulley 16 have been displaced to automatically compensate for an increase in torque load on the pump. Line 27 represents the distance between pulley centers of the drive belt 50 after said belt and the pump pulley 16 are displaced by the automatic belt tensioning means. The positions of the displaced pump shaft and the pump pulley are represented by 24a and 16a respectively. It is readily seen that the displaced drive belt 50 is caused to elongate and tighten by the displacement of its supporting pulley 16. The degree of tightening of belt 50 will depend on the particular combination of supporting and riding surfaces chosen in relation to the torque developed in the pump under load.

FIGURE 6 shows the relatively large width of the supporting and riding surfaces and the strap interposed therebetween. This relatively large width provides stability to the pump as torque on its pulley is increased and provides for a smooth rocking motion of the pump and its supporting arm 10.

In operation, referring to FIGURE 2 of the drawings, the driving belt 50 transmits a clockwise torque to pulley 16 and shaft 24 of the hydraulic pump shown. The resistance against rotation of said shaft by the back pressure developed in the fluid outlet line 18 will be transmitted to the pump housing as a force which will tend to rotate the housing in a clockwise direction. As the housing rotates the riding surface 11 of the pump supporting arm 10 will roll on the upper surface of strap 12 which in turn will roll up from the bracket supporting surface 9. The weight of the pump will be transmitted through strap 12 to the supporting surface 9. As the riding surface 11 rolls the strap 12 along the bracket surface 9 the pump and its pulley 16 will move away from the engine crankshaft pulley 22, and the belt 50 will elongate as shown by line 27 of FIGURE 5 and will tighten on pulleys 16 and 22. The stop means composed of elements 30, 31, and 34 of FIGURE 2, or stop means 46 of FIGURE 3 prevent the clockwise rotation of the pump to a degree that would overtighten the drive belt. It is noted that either variation of the stop means would act also to prevent the pump from falling excessively far to the right in the event that the driving belt 50 or strap 12 should break. It is noted also that as the slotted abutment member 19 moves laterally to the right in FIGURE 2 in response to clockwise rotation of the pump, its longitudinal motion is limited by the guide stud 34 which is slidably fitted into the guide slot 29.

The initial tensioning of the belt is accomplished through adjusting slot 44 in bracket 39 which allows the distance between pulleys 16 and 22 to be varied by rotating the supporting surface 9 of the bracket 39 either in a clockwise or counterclockwise direction around bolt 42. It is noted that since the pump is mounted on an angle with respect to the vertical axis of the engine, it will have a tendency to fall to the right and downward as shown in FIGURE 1 and its weight will cause an initial tensioning of the belt.

The spring 28 shown in FIGURE 2, which will help produce an initial belt tension, may not be needed to urge arm 10 outwardly and cause initial tightening of the belt 50 since the weight of the pump will cause riding surface 11 to rock to the right as shown in FIGURE 3 on supporting surface 9 and thereby tighten the belt 50 sufficiently to allow the transmission of power to the pump pulley 16. FIGURE 3 shows the variation of the mount wherein spring 28 is omitted. It is noted that the slippage of the belt on pulleys 16 and 22 occurs to an undesirable degree when a heavy load is placed on the pump and heavy back pressure develops in outlet line 18.

In accordance with this invention either or both of the supporting and the riding surfaces may curve as shown in FIGURE 3 to produce a particular rate of tightening of the belt. Moreover, should a fast rate of tightening be required, either the plane of the supporting surface 9 could be made more horizontal with respect to the horizontal axis of the engine, and/or the riding surface 11 could be given a cam shape as shown in FIGURE 4.

While I have shown a particular embodiment of my invention in connection with a belt driven hydraulic power steering pump, I do not desire my invention to be limited to the particular construction shown and described, and I intend in the appended claims to cover all modifications within the spirit and scope of my invention including the application of this invention to a driving as well as a driven member.

What I claim as new and desire to secure by Letters Patent of the United States is:

1. In an automotive conveyance having a drive pulley operatively connected by a flexible drive belt to the pulley of a power steering pump wherein the output pressure varies between a minimum value at straight ahead steering position and a maximum value of many times said minimum value during full load steering conditions, a mounting for said pump comprising pump supporting means carried by said conveyance, and support engaging means carried by said pump and movably carried by said pump supporting means to provide a pivot for said pump, said supporting and engaging means cooperating to automatically allow pivotal movement of said pump in a direction moving said pump pulley away from said drive pulley in response to an increase in fluid pressure in said pump to thereby increase the tension on said drive belt, said pivot and the centers of said pulleys being approximately in line.

2. In an automotive conveyance having a drive pulley operatively connected by a flexible drive belt to the pulley of a power steering pump wherein the output pressure varies between a minimum value of about 60 p.s.i. at straight ahead steering position and a maximum value of about 1,000 p.s.i. during full load steering conditions, a mounting for said pump comprising a pump supporting surface carried by said conveyance, and a support engaging surface carried by said pump and movably carried by said pump supporting surface to provide a pivot for said pump, said pivot and the centers of said pulleys being approximately in line, said supporting and engaging surfaces cooperating to automatically allow pivotal movement of said pump, said surfaces being so shaped relative to each other as to cause said pump and pulley to move away from said drive pulley in response to an increase in fluid pressure in said pump to thereby increase the tension on said drive belt according to steering force required.

3. In an automotive conveyance having a drive pulley operatively connected by a flexible drive belt to the pulley of a power steering pump wherein the output pressure varies between a minimum value at straight ahead steering position and a maximum value of many times said minimum value during full load steering conditions, a mounting for said pump comprising a pump supporting surface carried by said conveyance, and a support engaging surface carried by said pump and rollingly carried by said pump supporting surface to provide a rolling pivot for said pump, said pivot and the centers of said pulleys being approximately in line, said supporting and engaging surfaces cooperating to automatically allow pivotal movement of said pump, said surfaces being so shaped relative to each other as to cause said pump and pulley to move away from said drive pulley in response to an increase in fluid pressure in said pump to thereby increase the tension on said drive belt.

4. In an automotive vehicle having a drive pulley operatively connected by a flexible drive belt to the pulley of a power steering pump wherein the output pressure varies between a minimum value at straight ahead steering position and a maximum value of many times said minimum value during full load steering conditions, a mounting for said pump comprising a pump supporting surface carried by said conveyance, said pump having a support engaging surface rollingly carried by said pump supporting surface to provide a rolling pivot for said pump, means connecting said surfaces to prevent slippage while allowing rolling motion therebetween, said pivot and the centers of said pulleys being approximately in line, said supporting and engaging surfaces cooperating to automatically allow pivotal movement of said pump, said surfaces being so shaped relative to each other as to cause said pump and pulley to move away from said drive pulley in response to an increase in fluid pressure in said pump to thereby increase the tension on said drive belt.

5. In an automotive vehicle having a drive pulley operatively connected by a flexible drive belt to the pulley of a power steering pump wherein the output pressure varies between a minimum value at straight ahead steering position and a maximum value of many times said minimum value during full load steering conditions, a mounting for said pump comprising a pump supporting surface carried by said conveyance, said pump having a support engaging surface rollingly carried by said pump supporting surface to provide a rolling pivot for said pump, means connecting said surfaces to prevent slippage while allowing rolling motion therebetween, said pivot and the centers of said pulleys being approximately in line, said supporting and engaging surfaces cooperating to automatically allow pivotal movement of said pump, said surfaces being so shaped relative to each other as to cause said pump and pulley to move away from said drive pulley in response to an increase in fluid pressure in said pump to thereby increase the tension on said drive belt, and stop means on said vehicle for engaging said pump and preventing excessive rolling movement thereof.

References Cited in the file of this patent

UNITED STATES PATENTS

| | | |
|---|---|---|
| 1,396,966 | Lyon et al. | Nov. 15, 1921 |
| 1,868,533 | Johnson | July 26, 1932 |
| 1,894,904 | De Rabot | Jan. 17, 1933 |
| 1,960,506 | Pfleger | May 29, 1934 |
| 2,002,793 | Park | May 28, 1935 |
| 2,764,341 | Greiner | Sept. 25, 1956 |

FOREIGN PATENTS

| | | |
|---|---|---|
| 736,472 | France | Sept. 19, 1932 |